United States Patent
Oba

(10) Patent No.: US 6,312,353 B1
(45) Date of Patent: Nov. 6, 2001

(54) CHAIN GUIDE

(75) Inventor: Fumiaki Oba, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/517,896

(22) Filed: Mar. 3, 2000

(30) Foreign Application Priority Data

Mar. 3, 1999 (JP) ................................................ 11-055053

(51) Int. Cl.$^7$ ..................................................... F16H 7/18
(52) U.S. Cl. ............................................ 474/140; 474/111
(58) Field of Search ................................... 474/140, 111, 474/133

(56) References Cited

U.S. PATENT DOCUMENTS

| | | | |
|---|---|---|---|
| 4,832,664 | * | 5/1989 | Groger et al. ................ 474/111 |
| 5,647,812 | * | 7/1997 | McDonald et al. ............ 474/111 |
| 5,665,019 | * | 9/1997 | Sheffer et al. ................ 474/111 |
| 5,989,138 | * | 11/1999 | Capucci ..................... 474/140 X |

FOREIGN PATENT DOCUMENTS 35 25 746 * 1/1987 (DE) ................................. 474/111

* cited by examiner

*Primary Examiner*—Rodney H. Bonck
(74) *Attorney, Agent, or Firm*—Dann, Dorfman, Herrell and Skillman, P.C.; Henry H. Skillman

(57) ABSTRACT

A chain guide for guiding a chain includes an elongated chain guide body pivotally connected at one end to a fixed support member and having an aperture formed in an opposite end of the chain guide body, and a collar loosely fitted in the aperture in such a manner that a clearance is defined between the chain guide body and the collar at least on that side of the collar which is aligned with a direction of pivotal movement of the chain guide body. The collar is firmly secured to the fixed support member so that the chain guide body is allowed to pivot within the range of the clearance. With the clearance thus provided, the chain is protected against excessive tightening or loosening which may otherwise occur when the chain guide is mounted on the fixed support member.

4 Claims, 5 Drawing Sheets

CHAIN GUIDE

BACKGROUND OF THE INVENTION

1. Field of the Invention

The present invention relates generally to a chain guide held in sliding contact with a chain for guiding the chain and, in particular, to a chain guide being capable of preventing excessive tightening and loosening of the chain during operation.

2. Description of the Related Art

Conventionally, chains have been used for transmitting rotation of a crankshaft of an engine to a camshaft. A typical example of such a chain is shown in FIG. 6 hereof. The chain 41 is trained around a drive sprocket 43 fixed to the crank-shaft 42 and a driven sprocket 45 fixed to the camshaft 44. A chain guide 46 is disposed between the drive sprocket 43 and the driven sprocket 45 and held in sliding contact with the chain 41 for preventing swinging of the chain upon running of the latter.

The chain guide 46 includes a shoe held in sliding contact with the chain 41. The chain guide 46 has one end secured to a mount surface of an engine (not shown) by means of a bolt 47 and an opposite end with an anchoring arm 48 secured to the mount surface of the engine by means of a bolt 50 passing through an oblong hole 49 formed in the anchoring arm 48.

After the conventional chain guide 46 is attached to the mount surface, it needs to be positionally fixed such that the chain 41 is not over tightened. However, such a position-fixing operation is difficult to achieve even when the oblong hole 49 is marked with a graduation for position adjustment, because the chain guide 46 has no means for preventing excessive tightening of the chain 41. Practically, to avoid loosening of the chain after assemblage, the chain guide 46 is fixed with the anchoring arm 48 pushed or forced toward the chain 41 to thereby tension the chain. This often results in fixing of the chain guide 46 with the chain 41 over tightened. The thus-over-tightened chain 41 poses a problem that it produces a whistling sound when driven. To avoid such over tightening of the chain, one may fix the anchoring arm 48 at a retracted position along the graduation. However, this will lead to another problem that unless the anchoring arm 48 is retracted a precisely appropriate amount, the chain becomes loose and hence produces flapping noises.

SUMMARY OF THE INVENTION

It is therefore an object of the present invention to provide a chain guide which can be positionally fixed with a simple operation so that excessive tightening and loosening of the chain are prevented.

According to the present invention, there is provided a chain guide comprising: an elongated chain guide body adapted to be held in sliding contact with a chain for guiding the chain, the chain guide body being pivotally mounted at one end to a fixed support member by means of a support axle and having an aperture formed in an opposite end of the chain guide body; and a collar loosely fitted in the aperture in such a manner that a clearance is defined between a peripheral wall of the aperture and the collar at least on that side of the collar which is aligned with a direction of pivotal movement of the chain guide body about the support axle. The collar is firmly secured to the fixed support member so that the chain guide body is allowed to pivot about the support axle in the direction within the range of the clearance.

With this construction, the loose-fit connection between the collar and the chain guide body enables the collar to be secured to the fixed support member with the chain guide body being pressed or forced toward the chain. When the pressure or force on the chain guide body is released, a tension stored in the chain causes the chain guide body to turn or pivot backward away from the chain is forcibly turned or pivoted backward within the range of the clearance. Thus, over-tightening of the chain can be avoided. Preferably, a maximum extent of the clearance is so set as to prevent excessive loosening of the chain which may often result in generation of flapping noises.

The collar may be made of an elastic material in which instance the elastic collar is elastically deformable to increase the range of pivotal movement of the chain guide body by an amount equal to the amount of elastic deformation of the elastic collar. The elastic collar is able to absorb an impact or shock force applied from the chain to the chain guide body.

The collar preferably has an oblong hole formed therein with its major axis substantially aligned with the direction of pivotal movement of the chain guide body. With the oblong hole thus provided, the position of the collar relative to the chain can be adjusted.

In one preferred form of the invention, the collar has a cylindrical shape and the aperture has a generally circular shape with diametrically opposite segmental portions removed. The aperture has a maximum diameter larger than an outside diameter of the cylindrical collar by a distance equal to the amount of the clearance. The peripheral wall of the aperture includes a pair of diametrically opposed flat surfaces forming the removed segmental portions of the generally circular aperture. The flat surfaces are substantially parallel to the direction of movement of the chain guide body and slidably engageable with an outer peripheral surface of the collar for guiding pivotal movement of the chain guide body.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
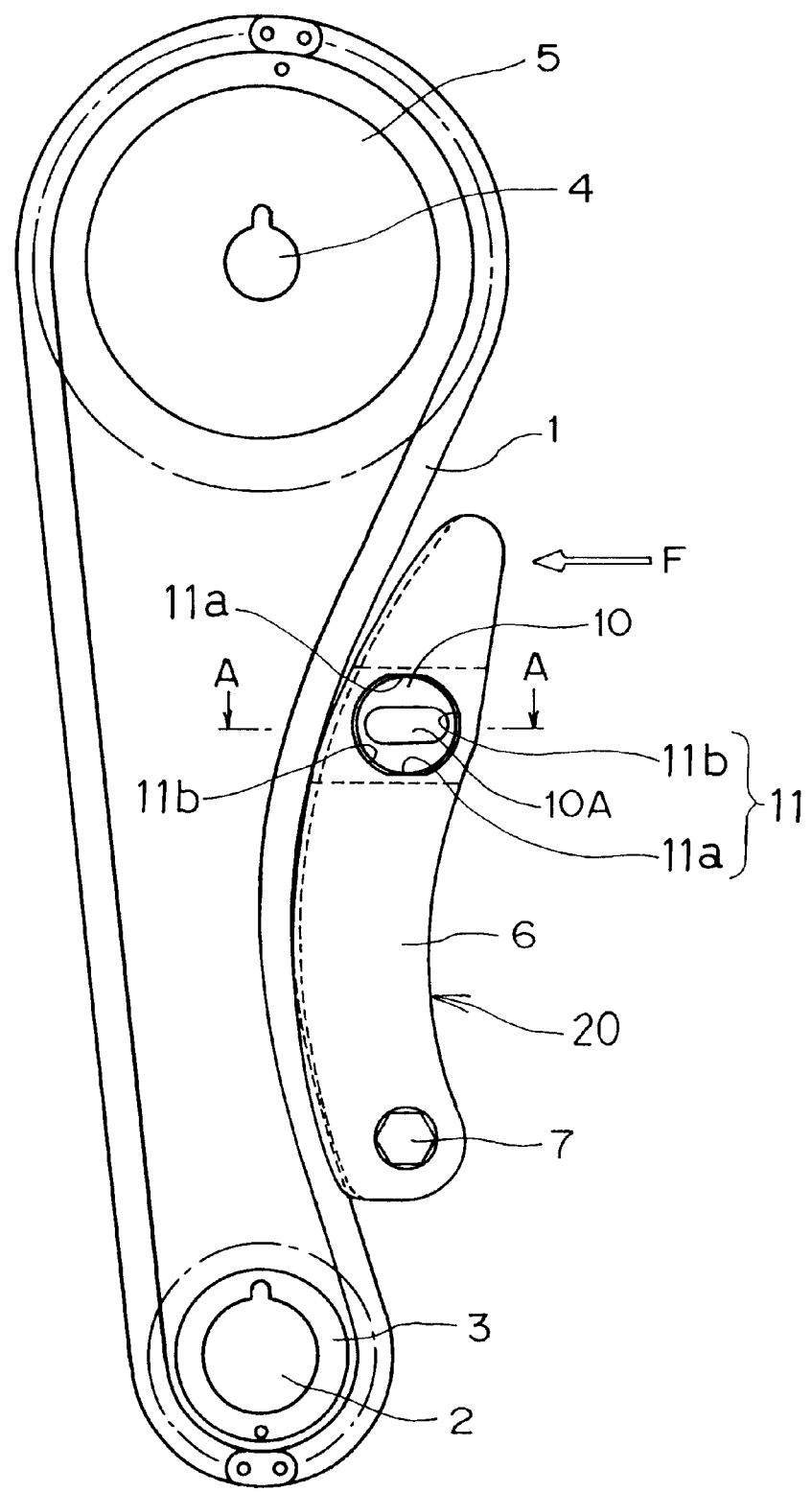
FIG. 1 is a front elevational view illustrating a chain guide according to the present invention, in operational engagement with a chain.
Figure 2:
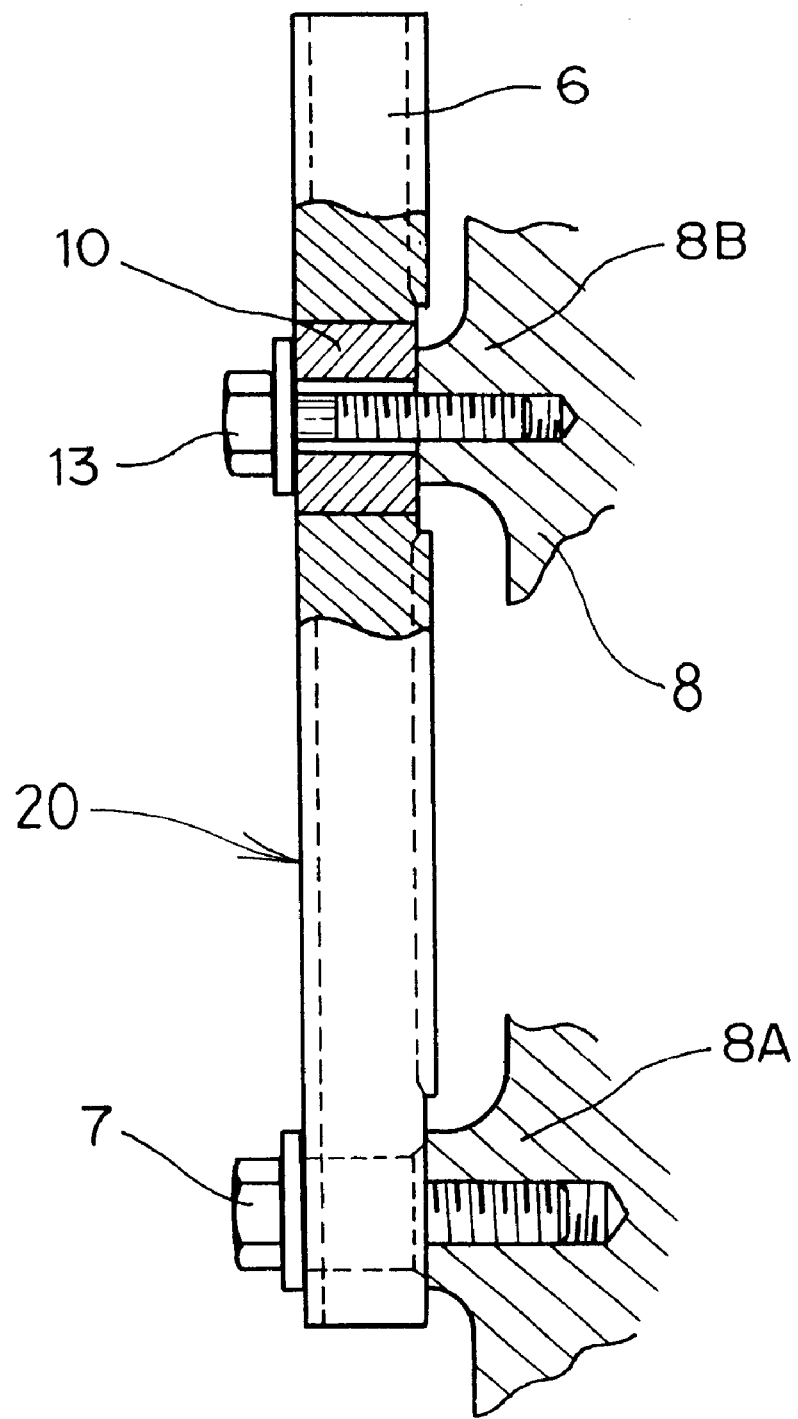
FIG. 2 is a side view, with parts in cross section, of the chain guide as attached to a mounting surface.

Referring to FIG. 1, a chain 1 is trained around a drive sprocket 3 secured to a crankshaft 2 of an engine 8 (FIG. 2)

and a driven sprocket 5 secured to a camshaft 4 of the engine. A chain guide 20 according to the present invention is disposed between the drive and driven sprockets 3, 5 and held in sliding engagement with the chain 1 for guiding the latter.

The chain guide 20 includes an elongated body 6 having a shoe (not designated) held in sliding contact with the chain 1 and a plate base (not designated) carrying the shoe. As can be appreciated from FIGS. 1 and 2, one end of the elongated chain guide body 6 is pivotally mounted to a mount surface 8a of the engine 8 by means of a support axle 7 comprised of a shouldered bolt. That is, the chain guide body 6 is pivotable about the support axle 7, and the engine 8 forms a fixed support member for the chain guide body 6.

Figure 3:
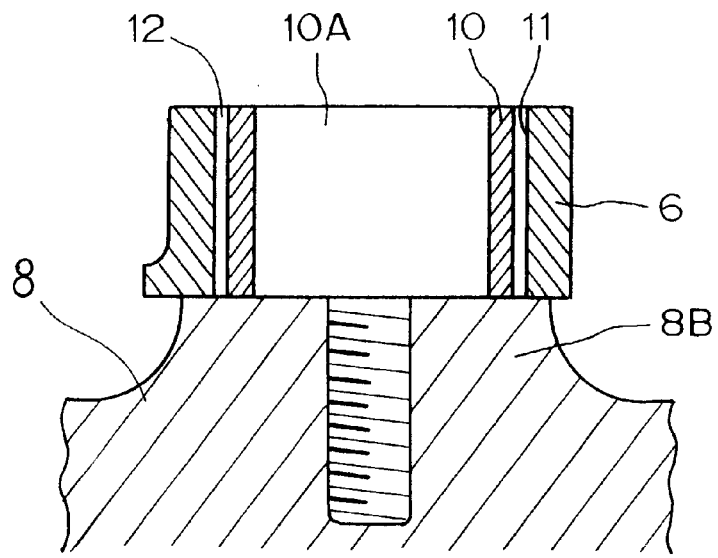
FIG. 3 is a cross-sectional view taken along line A—A of FIG. 1, illustrating a collar loosely fitted in a receiving aperture.

Opposite end of the elongated chain guide body 6 is secured to a mount surface 8b of the engine 8 by means of a shouldered bolt 13, as shown in FIG. 2, such that pivotal movement of the chain guide body 6 about the support axle 7 is allowed. The shouldered bolt 13 is not shown in FIGS. 1 and 3 for clarity. As shown in FIGS. 1 and 3, in the opposite end of the chain guide body 6, there is formed a receiving hole or aperture 11 for receiving a collar 10. The collar 10 is loosely fitted in the aperture 11 such that a gap or clearance 12 (FIG. 3) is defined between a peripheral wall of the aperture 11 and the collar 10 at least on that side of the collar 10 which is substantially aligned with the direction of pivotal movement of the chain guide body 6 about the support axle 7.

As shown in FIG. 1, the aperture 11 is generally circular in shape and has diametrically opposite segmental portions cutout or removed. More specifically, the peripheral wall of the aperture 11 includes a pair of diametrically opposed flat surfaces 11a, 11a and a pair of diametrically opposed arcuate surfaces 11b, 11b of the same radius of curvature interconnected by the flat surfaces 11a, 11a. The flat surfaces 11a, 11a are substantially parallel to the direction of pivotal movement of the chain guide body 6. The collar 10 has a cylindrical shape having an outside diameter which is substantially equal to or slightly smaller than the distance between the flat surfaces 11a (i.e., a minimum diameter of the aperture 11) and is smaller than a maximum diameter of the aperture 11 to such an extent as to allow pivotal movement of the chain guide body 6 about the support axile 7.

The collar 10 has an oblong hole 10A formed therein. The oblong hole 10A has a major axis extending in substantially the same direction as the direction of pivotal movement of the chain guide body 6. The shouldered bolt 13 (FIG. 2) is inserted into the oblong hole 10A and then threaded into a threaded hole (not designated) in the engine 8 to firmly secure the collar 10 to the mount surface 8b of the engine. Thus, the opposite end of the chain guide body 6 is mounted to the engine body.

Under such mounted condition, since one end of the chain guide body 6 is pivotally mounted by the support axle 7 to the engine 8, removal of the opposite end of the chain guide body 6 from the collar 10 does not take place. To insure removal-free mounting of the opposite end, the collar 10 may be replaced with a flanged collar (not shown) in which instance the opposite end of the chain guide body 6 is held between a flange of the collar and the mounting surface 8b of the engine 8.

The chain guide 20 of the foregoing construction is incorporated in a chain transmission device including the chain 1 (FIG. 1), as follows.

One end of the chain guide body 6 is pivotally mounted to the mount surface 8a of the engine (fixed support member) 8 by means of the support axle (shouldered bolt) 7. Subsequently, the collar 10 is fitted in the aperture 11 formed in the opposite end of the chain guide body 6, and after that the shouldered bolt 13 is threaded through the oblong hole 10A in the collar 10 into the threaded hole (not designated) in the engine 8 such that the collar 10 is lightly fastened to the mount surface 8b of the engine for temporarily setting the position of the collar 10.

Figure 4:
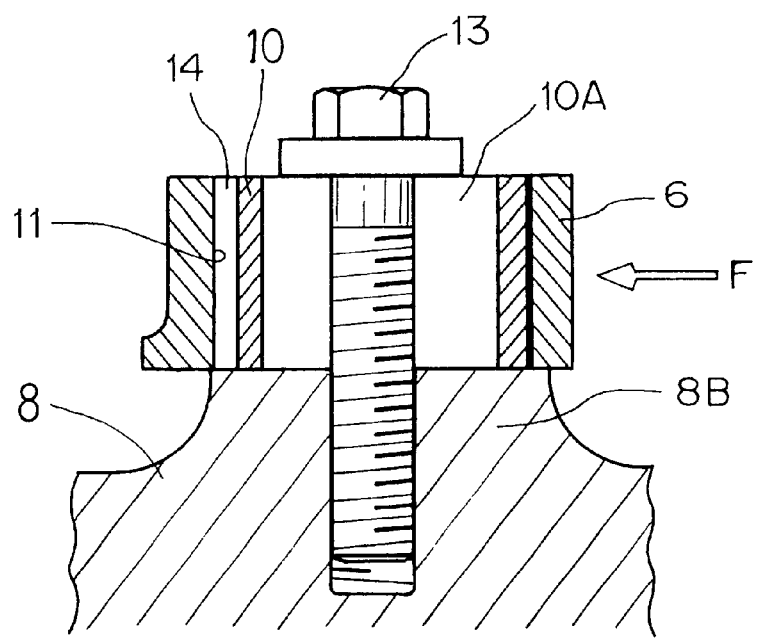
FIG. 4 is a cross-sectional view illustrating the collar as fixed.

Then, the opposite end of the chain guide body 6 is pressed or forced in the direction of the arrow F (FIGS. 1 and 4) toward the chain 1 to thereby displace the collar 10 in a longitudinal direction of the oblong hole 10A toward the chain 1 while the collar 10 is guided by the bolt 13 received in the oblong hole 10A. In this instance, a gap or clearance 14 (FIG. 4) is formed between the peripheral wall of the aperture 11 and an outer peripheral surface of the collar 10 on one side of the collar 10 which is substantially aligned with the direction of pivotal movement of the chain guide body 6. While keeping this condition, the bolt 13 is tightly fastened so that the collar 10 is fixed to the mount surface 8B of the engine 8 with the clearance 14 defined between the peripheral wall of the aperture 11 and the collar 10.

Subsequently, the pressure or force on the chain guide body 6 acting in the direction of the arrow F is released, whereupon due to a tension stored in the chain 1, the chain guide body 6 is forced to turn backward about the support axle 7 until the peripheral wall of the aperture 11 engages the outer peripheral wall of the collar 10 where a similar clearance (not shown) is formed on the opposite side of the collar 10. Thus, over-tightening of the chain 1 can be avoided. Additionally, since further backward movement of the chain guide body 6 is prevented by the collar 10, excessive loosening of the chain 1 does not take place.

As described above, by virtue of the collar 10 loosely fitted in the aperture 11 formed in the opposite end (distal end) of the chain guide body 6, the chain guide body 6 while in operation is allowed to pivot within the range of the clearance 14 which is provided during assemblage of the chain guide 20 with respect to the engine 8. With this pivotal movement of the chain guide body 6, excessive tightening of the chain 1 can be avoided. Additionally, the oblong hole 10A formed in the collar 10 enables positional adjustment of the collar 10 relative to the chain 1. Accordingly, when the chain 1 undergoes elongation during operation, the collar 10 may be displaced in a longitudinal direction of the oblong hole to thereby adjust the chain tension in the same manner as done in the initial assemblage of the chain guide 20 with respect to the engine 8.

In the embodiment described above, the chain guide is incorporated in a chain transmission device with no tensioner provided on the opposite side of the chain guide. It is to be noted however that the chain guide may be used with a tensioner, such as a hydraulic tensioner provided in confrontation to the chain guide for applying a proper tension to the chain. The fixed support member on which the chain guide is mounted should by no means be limited to the engine but may include any other part or member to which the chain transmission device is applied.

Figure 5:
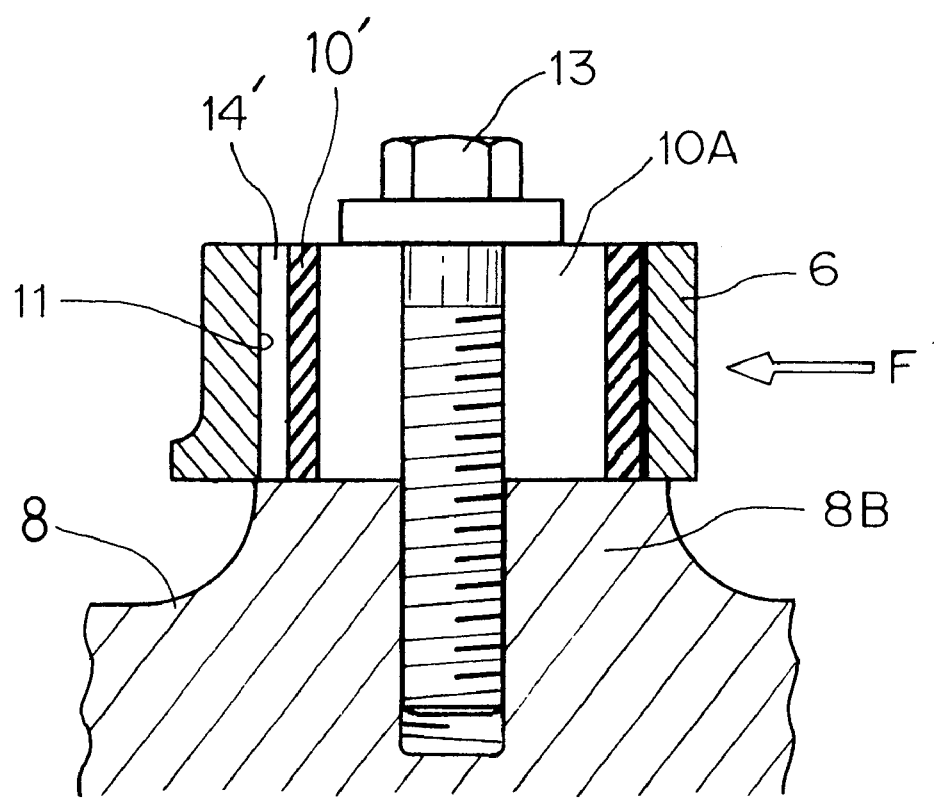
FIG. 5 is a view similar to FIG. 4, but showing a modified form of the collar according to the present invention.
Figure 6:
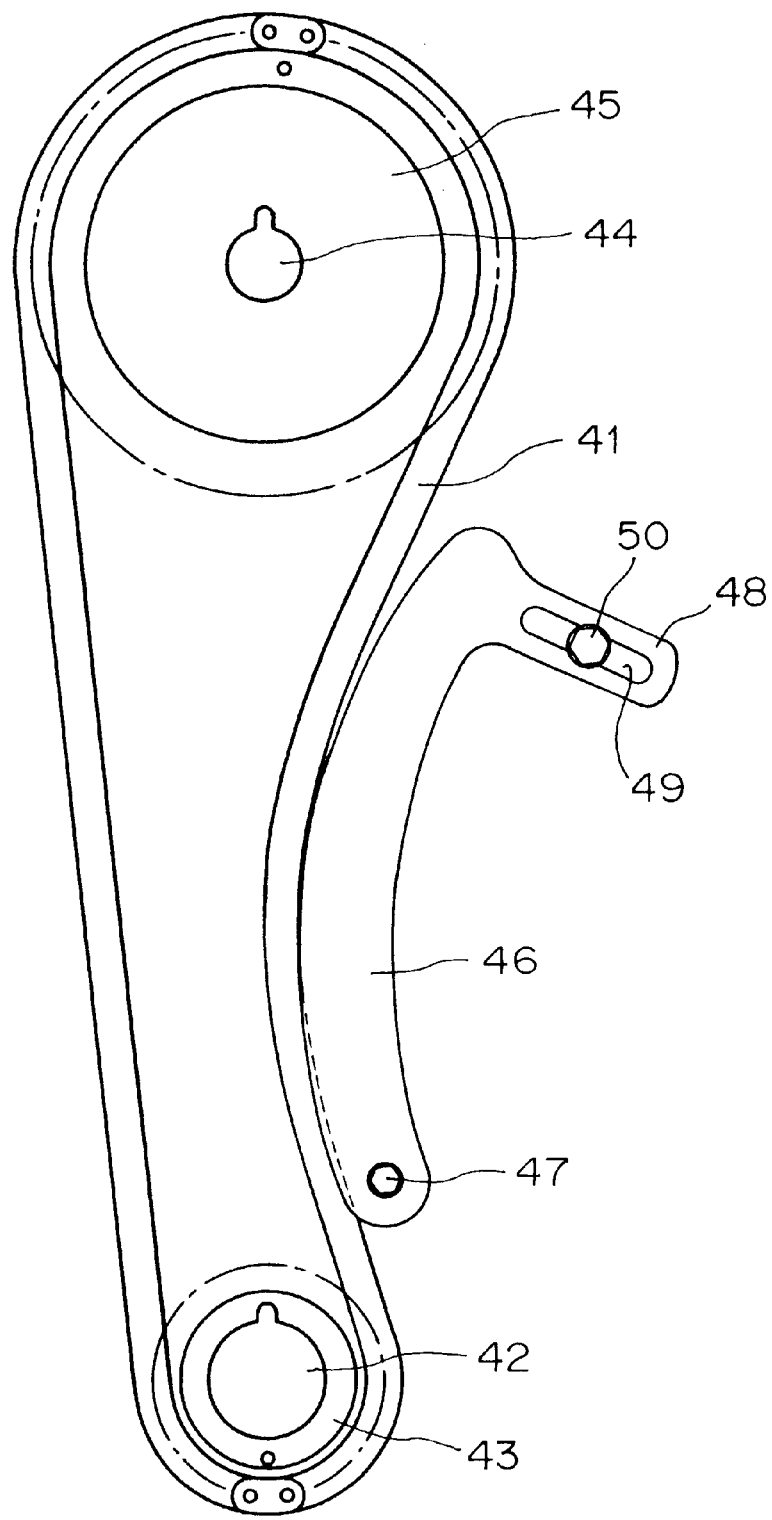
FIG. 6 is a front elevational view illustrating a conventional chain guide in operational engagement with a chain.

The collar in the illustrated embodiment is made of metal. As an alternative, the collar may be made of an elastic material, such as plastics or rubber. As shown in FIG. 5, such elastic collar 10' is advantageous because it is elastically deformable to increase the range of pivotal movement of the chain guide body 6 by an amount equal to the amount of elastic deformation of the elastic collar 10'. In other words, the clearance 14', which is provided between the peripheral wall of the aperture 11 and the elastic collar 10' when the chain guide body 6 and the collar 10 are assembled, can be made smaller than the corresponding clearance 14 (FIG. 4) between the chain guide body 6 and the metallic non-elastic collar 10 by the amount of elastic deformation of the elastic collar 10'. The elastic collar 10' is further advantageous for its ability to absorb an impact or shock force applied from the chain 1 to the chain guide body 6.

It may be appreciated from the foregoing description that a chain guide according to the present invention includes an elongated chain guide body pivotally mounted at one end to a fixed support member by means of a support axle, and a collar loosely fitted in an aperture formed in an opposite end of the chain guide body. The collar is secured to the fixed support member so that the chain guide body is pivotally movable about the support axle within the range of a clearance formed between a peripheral wall of the aperture and an outer peripheral surface of the collar. When attaching the collar to the fixed support member, the opposite end of the chain guide body is forced against a chain. After attachment of the collar completes, the pressure on the chain guide body is released whereupon the chain guide body is forced to turn or pivot backward away from the chain due to a tension stored in the chain. The chain can thus be prevented from being excessively tightened. Additionally, a chain slack which may be produced due to elongation of the chain during use can be taken up or canceled by properly adjusting the position of the collar using a combination of a bolt and an oblong hole formed in the collar. The chain transmission device incorporating the chain guide of the invention is substantially free from a problem that the chain becomes over-tightened and hence produces striking noises and a whistling sound when driven, or the chain becomes loose and hence produces flapping noises.

In the case where the collar is made of an elastic material such as plastics or rubber, it is possible to increase the range of pivotal movement of the chain guide body by an amount equal to the amount of elastic deformation of the elastic collar. In other words, the clearance which is provided between the chain guide body and the elastic collar when they are set on the fixed support member can be set smaller than the corresponding clearance between the chain guide body and the non-elastic collar. The elastic collar is able to absorb an impact or shock force applied from the chain to the chain guide body.

Obviously, various minor changes and modifications of the present invention are possible in the light of the above teaching. It is therefore to be understood that within the scope of the appended claims, the present invention may be practiced otherwise than as specifically described.

What is claimed is:

1. A chain guide comprising:
   an elongated chain guide body adapted to be held in sliding contact with a chain for guiding the chain, said chain guide body being pivotally mounted at one end to a fixed support member by means of a support axle and having an aperture formed in an opposite end of said chain guide body; and
   a collar loosely fitted in said aperture in such a manner that a clearance is defined between a peripheral wall of said aperture and said collar at least on that side of said collar which is aligned with a direction of pivotal movement of said chain guide body about said support axle, said collar being firmly secured to said fixed support member so that said chain guide body is allowed to pivot about said support axle in said direction within the range of said clearance, said collar having an oblong hole formed therein, said oblong hole having a major axis substantially aligned with said direction of pivotal movement of said chain guide body.

2. A chain guide according to claim 1, wherein said collar is made of elastic material and is elastically deformable to increase the range of pivotal movement of said chain guide body by an amount equal to the amount of elastic deformation of said collar.

3. A chain guide comprising:
   an elongated chain guide body adapted to be held in sliding contact with a chain for guiding the chain, said chain guide body being pivotally mounted at one end to a fixed support member by means of a support axle and having an aperture formed in an opposite end of said chain guide body; and
   a collar having a cylindrical shape and being loosely fitted in said aperture in such a manner that a clearance is defined between a peripheral wall of said aperture and said collar at least on that side of said collar which is aligned with a direction of pivotal movement of said chain guide body about said support axle, said collar being firmly secured to said fixed support member so that said chain guide body is allowed to pivot about said support axle in said direction within the range of said clearance,
   said aperture having a generally circular shape with diametrically opposite segmental portions removed, said aperture having a maximum diameter larger than an outside diameter of said cylindrical collar by a distance equal to the amount of said clearance, said peripheral wall of said aperture including a pair of diametrically opposed flat surfaces forming said removed segmental portions of said generally circular aperture, said flat surfaces being substantially parallel to said direction of movement of said chain guide body and slidably engageable with an outer peripheral surface of said collar for guiding pivotal movement of said chain guide body.

4. A chain guide according to claim 3, wherein said collar is made of elastic material and is elastically deformable to increase the range of pivotal movement of said chain guide body by an amount equal to the amount of elastic deformation of said collar.

* * * * *